Nov. 19, 1963  W. ANTRITTER  3,111,597
ELECTRICAL SPEED MEASURING AND RECORDING DEVICES
Filed Nov. 29, 1960
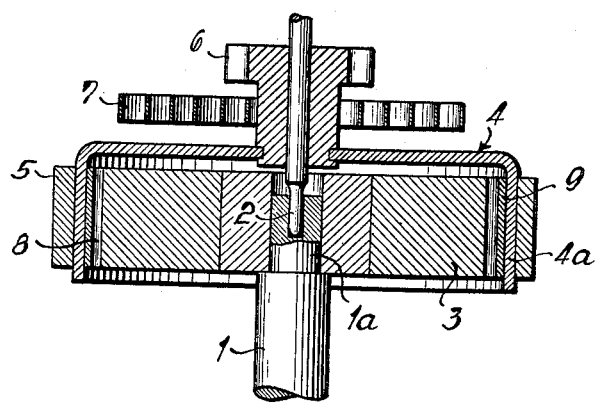
INVENTOR:
WERNER ANTRITTER
BY Michael S. Striker
his ATTORNEY ent of heat developing in the drag-cup is actually transmitted to the compensating element, i.e. the later is not heated to the same extent and at the same time as the drag-cup.

United States Patent Office 3,111,597
Patented Nov. 19, 1963

3,111,597
ELECTRICAL SPEED MEASURING AND RECORDING DEVICES
Werner Antritter, Villingen, Black Forest, Germany, assignor to Kienzle Apparate G.m.b.H., Villingen, Black Forest, Germany
Filed Nov. 29, 1960, Ser. No. 72,389
Claims priority, application Germany Dec. 3, 1959
6 Claims. (Cl. 310—97)

The present invention relates to improvements in speed measuring and recording devices, such as revolution counters, tachometers, tachographs, and the like. More particularly, the invention relates to improvements in electrical speed measuring and recording devices for engine-driven conveyances whose operation is based on the eddy current principle and which embody a temperature compensating element.

In electric speed measuring and recording devices whose dimensions are comparatively small, the reading or indicating error increases proportionally with each increase in the driving torque.

Such reading errors are due to the fact that electrical resistance depends on the temperature of the drag-cup. It is already known to provide a temperature compensating element with a view to eliminate or to at least reduce the errors in readings obtainable with an electric speed recording device. For example, the changes in temperature of the drag-cup may be compensated for by utilizing an element consisting of a material whose magnetic conductivity drops with rising temperatures. Such element assumes the form of a disk or annulus which is secured directly to the magnet in such a way that, at low temperatures, it actually "absorbs" a certain number of magnetic force lines. As is known, the major part of such magnetic force lines passes through a so-called short-circuiting member which normally assumes the shape of an iron ring. As a result of heating and consequent rise in the electrical resistance of the drag-cup and of the compensating element, the magnetic conductivity of the compensating element is reduced. The heating of the drag-cup is induced by eddy currents which develop when the magnet rotates and the heat is radiated through the air gap to raise the temperature of the magnet. As the magnetic conductivity of the compensating element decreases, its ability to "absorb" magnetic force lines also decreases; consequently, a large number of magnetic force lines will pass through the air gap, through the drag-cup and into the iron ring.

It will be readily understood that in such conventional speed measuring devices wherein the drag-cup and the compensating element are disposed at the opposite sides of an air gap, a certain delay in heating of the compensating element to the exact temperature of the drag-cup is unavoidable. This is due to the fact that heat which is induced in the drag-cup must be radiated through the air gap before it is transmitted to the compensating element. In addition, only a certain percentage of heat developing in the drag-cup is actually transmitted to the compensating element, i.e. the later is not heated to the same extent and at the same time as the drag-cup.

An important object of the present invention is to provide a speed measuring and recording device of the electrical type which avoids the drawbacks of the above described prior devices and wherein the transmission of heat from the drag-cup to the compensating element occurs without any heat losses and without any delays.

Another object of the invention is to provide an electrical speed measuring and recording device wherein the dimensions and the weight of the temperature compensating element may be reduced to a minimum.

A further object of my invention is to provide a device of the just outlined characteristics wherein the compensating element is capable of immediately reacting to any changes in temperature of the drag-cup, which may be produced at a reduced cost, which is extremely accurate and reliable in actual use, and which may be readily installed in tachometers, tachographs, revolution counters and similar instruments of presently known design.

With the above objects in view, the invention resides in the provision of an electrical speed measuring and recording device wherein the temperature compensating element is directly connected with the drag-cup. Consequently, any changes in temperature of the drag-cup are immediately transmitted to the compensating element to insure that the temperature compensation is instantaneous, so that the likelihood of errors in readings is reduced to a minimum.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawing, the single illustration of which is an axial section through a speed measuring device embodying my invention.

Referring now in greater detail to the drawing, there is shown a speed measuring device of the electrical type which comprises a driving shaft 1 adapted to rotate a magnet 3. The shaft 1 is provided with a trunnion 1a having a coaxial blind bore which receives the end of a staff 2 for an armature here shown as a drag-cup 4. This drag-cup has a tubular portion 4a which is mounted in inductive relation to the magnet 3 by surrounding and by being spaced from the periphery of the magnet. The magnet 3 is rigidly secured to the shaft 1 so that it rotates with the latter. The drag-cut 4 supports a coaxial iron ring 5 which is usually press-fitted to its portion 4a and which constitutes the aforementioned short-circuiting member. A motion-transmitting gear 6 is connected for rotation with the staff 2 and is rigidly connected with the drag-cup 4 so that the parts 2, 4, 6 always rotate in unison. The gear 6 causes deflections of a pointer (not shown) or it may drive a speed recording assembly of any known design. This gear is connected with a restoring hairspring 7 which permanently biases the staff 2 to its zero position.

In accordance with my invention, the portion 4a of the drag-cup 4 is disposed about and is directly connected with a paramagnetic temperature compensating element in the form of a short tube or cylinder 9 which is press-fitted or otherwise secured to the inner side of the portion 4a to define with the periphery of the magnet 3 an annular air gap 8. Thus, the drag-cup 4 is in heat-exchanging contact with the element 9.

The main stream or flux of magnetic force lines passes through the air gap 8, through the temperature compensating element 9 and through the wall of the drag-cup 4 into the iron ring 5. At the opposite pole of the magnet 3, the magnetic force lines return from the ring 5, through the drag-cup 4, through the compensating element 9 and through the air gap 8 back in to the body of the magnet. A secondary flux of magnetic force lines passes from one pole of the magnet 3 through the air gap 8 and through the compensating element 9 to the other pole.

When the shaft 1 is driven to rotate the magnet 3, there develops a rotary magnetic field which induces eddy currents in the drag-cup 4. Such eddy currents produce a torque which is proportional with the rotational speed of the shaft 1 and which is resisted by the spring 7. At the same time, the eddy currents heat the drag-cup 4 by simultaneously reducing the electric conductivity of the latter. Owing to the fact that the compensating element 9 is directly connected with the drag-cup 4, and also because the materials of the drag-cup and of the compensating element are good heat conductors, the latter is heated simultaneously with and, hence, its temperature is always the same as that of the drag-cup. The magnetic conductivity of the compensating element 9 drops with increasing temperature, the secondary flux of magnetic force lines is then reduced and the main flux of magnetic force lines is increased. Consequently, any non-compensated losses as a result of eddy currents are fully avoided.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a speed measuring device, in combination, rotary magnet means for producing a flux of magnetic force lines; turnable current-conducting armature means mounted in inductive relation to said magnet means and intersecting said force lines so that eddy currents induced by rotating magnet means cause angular displacements of said armature means proportionally with the rotational speed of said magnet means, the electric conductivity of said armature means decreasing in response to heating thereof by said eddy currents; and temperature-compensating paramagnetic means disposed between said magnet means and said armature means for deflecting force lines from said flux, said paramagnetic means in heat-exchanging contact with said armature means and the magnetic conductivity of said paramagnetic means decreasing in response to heating thereof by said armature means whereby the number of force lines deflected by said paramagnetic means decreases in response to heating of said armature means.

2. In a speed measuring device, in combination, rotary magnet means for producing a flux of magnetic force lines; turnable current-conducting drag-cup means, at least a portion of one of said means surrounding and spaced from the other means so that said drag-cup means is in inductive relation to said magnet means by intersecting the force lines and that eddy currents induced by rotating magnet means cause angular displacements of said drag-cup means proportionally with the rotational speed of said magnet means, the electric conductivity of said drag-cup means decreasing in response to heating thereof by said eddy currents; and temperature-compensating tubular paramagnetic means disposed between said magnet means and said drag-cup means for deflecting force lines from said flux, said paramagnetic means in heat-exchanging contact with said drag-cup means and the magnetic conductivity of said paramagnetic means decreasing in response to heating thereof by said drag-cup means whereby the number of force lines deflected by said paramagnetic means decreases in response to heating of said drag-cup means.

3. In a speed measuring device, in combination, a rotary magnet for producing a flux of magnetic force lines, said magnet having a substantially cylindrical periphery; a turnable current-conducting drag-cup having a tubular portion surrounding and spaced from the periphery of said magnet so that the drag-cup is in inductive relation to said magnet, said tubular portion intersecting the magnetic force lines so that eddy currents induced by the rotating magnet cause angular displacements of said drag-cup proportionally with the rotational speed of the magnet, the electric conductivity of said tubular portion decreasing in response to heating thereof by said eddy currents; and a temperature compensating tubular paramagnetic element disposed between the periphery of said magnet and said tubular portion for deflecting force lines from said flux, said element in heat-exchanging contact with said tubular portion and the magnetic conductivity of said element decreasing in response to heating thereof by said tubular portion whereby the number of force lines deflected by said element decreases in response to heating of said tubular portion.

4. In a speed measuring device, in combination, rotary magnet means for producing a flux of magnetic force lines; turnable current-conducting drag-cup means, at least a portion of one of said means surrounding and spaced from the other means so that said drag-cup means is in inductive relation to said magnet means by intersecting the force lines and that eddy currents induced by rotating magnet means cause angular displacements of said drag-cup means proportionally with the rotational speed of said magnet means, the electric conductivity of said drag-cup means decreasing in response to heating thereof by said eddy currents; and temperature-compensating tubular paramagnetic means disposed between said magnet means and said drag-cup means for deflecting force lines from said flux, said paramagnetic means in heat-exchanging contact with said drag-cup means and defining an annular air gap with said magnet means, the magnetic conductivity of said paramagnetic means decreasing in response to heating thereof by said drag-cup means whereby the number of force lines deflected by said paramagnetic means decreases in response to heating of said drag-cup means.

5. In a speed measuring device, in combination, rotary magnet means for producing a flux of magnetic force lines; turnable current-conducting armature means mounted in inductive relation to said magnet means and intersecting said force lines so that eddy currents induced by rotating magnet means cause angular displacements of said armature means proportionally with the rotational speed of said magnet means, the electric conductivity of said armature means decreasing in response to heating thereof by said eddy currents; and temperature-compensating paramagnetic means disposed between said magnet means and said armature means for deflecting force lines from said flux, said paramagnetic means in heat-exchanging contact with said armature means and the magnetic conductivity of said paramagnetic means decreasing in response to heating thereof by said armature means whereby the number of force lines deflected by said paramagnetic means decreases in response to heating of said armature means, the materials of said armature means and of said paramagnetic means having high heat conductivity.

6. In a speed measuring device, in combination, a rotary magnet for producing a flux of magnetic force lines, said magnet having a substantially cylindrical periphery; a turnable current-conducting drag-cup having a tubular portion surrounding and spaced from the periphery of said magnet so that the drag-cup is in inductive relation to said magnet, said tubular portion intersecting the magnetic force lines so that eddy currents induced by the rotating magnet cause angular displacements of said drag-cup proportionally with the rotational speed of the magnet, the electric conductivity of said tubular portion decreasing in response to heating thereof by said eddy currents; a temperature-compensating tubular paramagnetic element disposed between the periphery of said magnet and said tubular portion for deflecting force lines from said flux, said element in heat-exchanging contact with said tubular portion and the magnetic conductivity of said element decreasing in response to heating thereof by said tubular portion whereby the number of force lines deflected by said element decreases in response to heating of said tubular portion; and an iron ring disposed about and secured to said tubular portion, the force lines intersected by said cylindrical portion passing through said ring and returning to said magnet.

References Cited in the file of this patent

UNITED STATES PATENTS

| | | |
|---|---|---|
| 993,910 | Thomson | May 30, 1911 |
| 2,245,784 | James | June 17, 1941 |
| 2,882,727 | Newbold | Apr. 21, 1959 |